United States Patent [19]

Hashimoto

[11] Patent Number: 5,712,729
[45] Date of Patent: Jan. 27, 1998

[54] ARTIFICIAL RETINA CELL, ARTIFICIAL RETINA AND ARTIFICIAL VISUAL APPARATUS

[75] Inventor: Takeshi Hashimoto, Tokyo, Japan

[73] Assignee: Olympus Optical Co., Ltd., Tokyo, Japan

[21] Appl. No.: 440,875

[22] Filed: May 15, 1995

Related U.S. Application Data

[63] Continuation of Ser. No. 46,742, Apr. 16, 1993, abandoned.

[30] Foreign Application Priority Data

Apr. 17, 1992 [JP] Japan ................................ 4-097756
Apr. 17, 1992 [JP] Japan ................................ 4-097757

[51] Int. Cl.$^6$ ............................................ G02B 27/46
[52] U.S. Cl. ................... 359/562; 359/559; 395/94; 901/47
[58] Field of Search ..................... 359/558, 559, 359/562, 564, 561; 395/94; 382/31, 153, 154, 181, 191, 324; 901/44, 47

[56] References Cited

U.S. PATENT DOCUMENTS

| | | |
|---|---|---|
| 3,524,706 | 8/1970 | Farr ................................ 359/559 |
| 3,724,930 | 4/1973 | Farmer ............................ 359/559 |
| 3,743,422 | 7/1973 | Wood .............................. 359/559 |
| 3,794,406 | 2/1974 | Kock et al. ...................... 359/559 |
| 3,821,794 | 6/1974 | Yoneyama ........................ 359/559 |
| 3,993,976 | 11/1976 | Ginsburg ......................... 382/211 |
| 4,183,623 | 1/1980 | Haines ............................ 359/564 |
| 4,271,413 | 6/1981 | Shreve ............................ 359/559 |
| 4,360,269 | 11/1982 | Iwamoto et al. ................ 359/559 |
| 4,381,137 | 4/1983 | Berg et al. ..................... 359/559 |
| 4,584,704 | 4/1986 | Ferren ............................. 382/65 |
| 4,900,128 | 2/1990 | Lom ................................. 359/561 |
| 4,947,413 | 8/1990 | Jewell et al. ................... 359/562 |
| 4,958,376 | 9/1990 | Leib ................................ 359/559 |
| 5,144,684 | 9/1992 | Inada et al. .................... 382/22 |
| 5,185,815 | 2/1993 | Brandstetter .................... 359/559 |
| 5,274,434 | 12/1993 | Morioka et al. ................. 356/237 |

FOREIGN PATENT DOCUMENTS 56-147119  11/1981  Japan ................................ 359/559

*Primary Examiner*—Paul M. Dzierzynski
*Assistant Examiner*—John Juba, Jr.
*Attorney, Agent, or Firm*—Cushman, Darby & Cushman IP Group of Pillsbury Madison & Sutro LLP

[57] ABSTRACT

An artificial retina cell effectively used to recognize a plurality of objects from an image containing them with ease and at high speed. Also disclosed are an artificial retina and an artificial visual apparatus employing the same. The artificial visual apparatus includes an artificial eyeball (3) having a focusing means (2) and an artificial retina (1) including a first artificial retina cell disposed in a central visual field (1a) to detect a bright-dark boundary by optical filtering and a second artificial retina cell disposed in a peripheral visual field (1b) to detect an object position by optical filtering, and a neural network (4) for executing pattern recognition of an object on the basis of information detected by the first artificial retina cell. The apparatus further includes a means for determining an object to be recognized subsequently from information detected by the second artificial retina cell of the artificial retina (1), and a means (5) for moving the artificial eyeball (3) toward the object to be recognized. Thus, a specific object in an image containing a plurality of objects of recognition is selectively recognized with ease and at high speed.

12 Claims, 13 Drawing Sheets

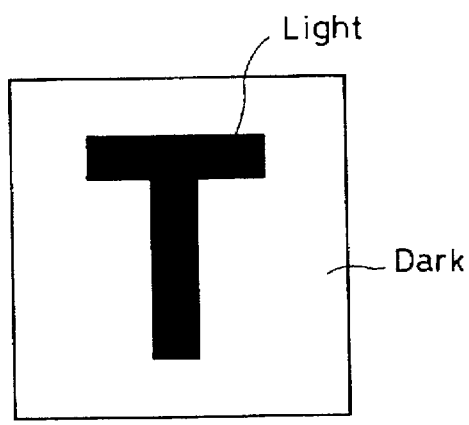
FIG. 7(a)
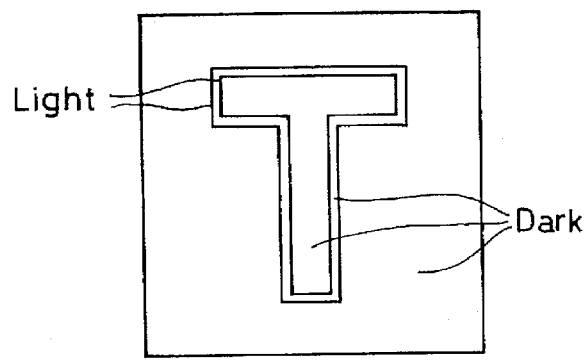
FIG. 7(b)
FIG. 8
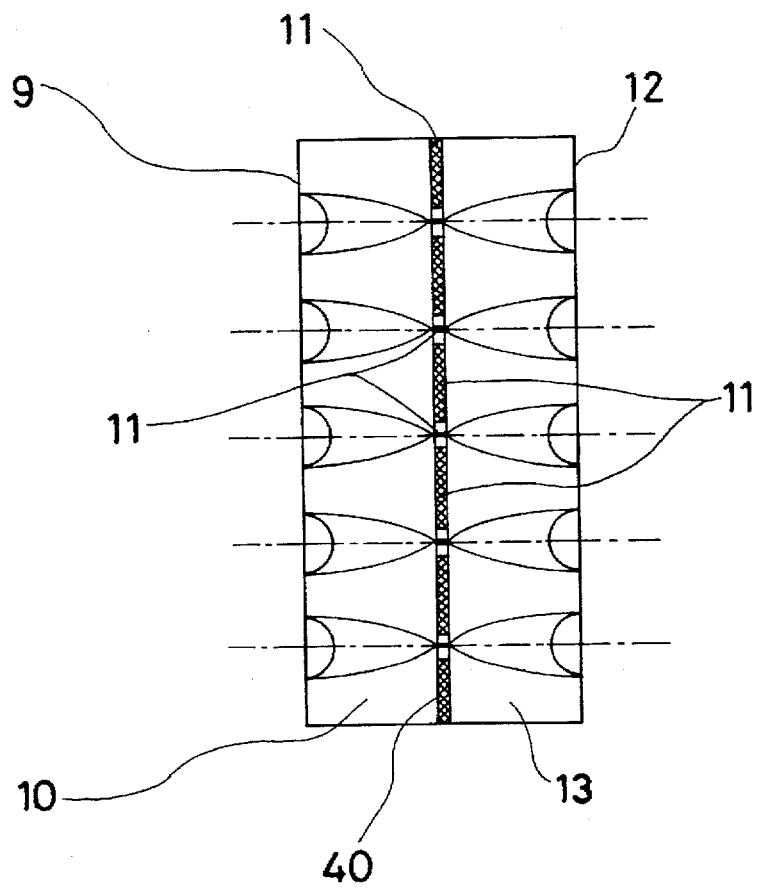

FIG. 9
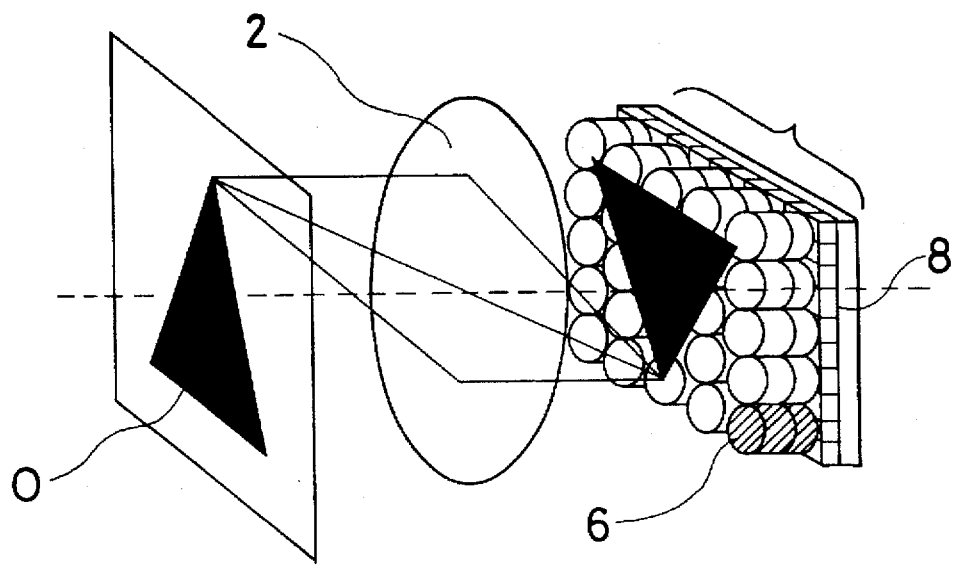
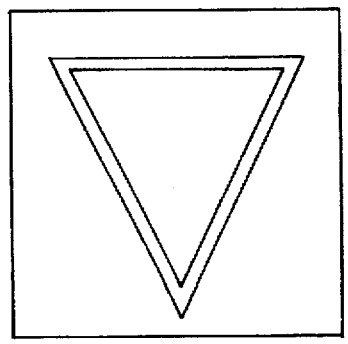
FIG. 10(a)
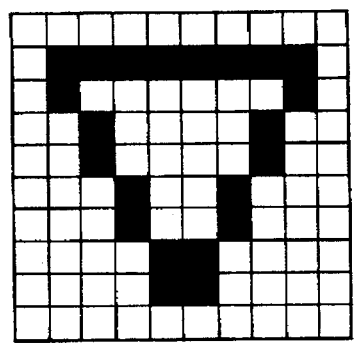
FIG. 10(b)

ARTIFICIAL RETINA CELL, ARTIFICIAL RETINA AND ARTIFICIAL VISUAL APPARATUS

This is a continuation of application Ser. No. 08/046,742, filed on Apr. 16, 1993, now abandoned.

BACKGROUND OF THE INVENTION

The present invention relates to an artificial retina cell, artificial retina and artificial visual apparatus, which are effective for recognition of objects from an image containing them.

Scenes which are seen in our daily life, that is, natural images, each contain a large number of objects to be recognized. We unconsciously recognize them before thinking, judging or acting. It is said that in the recognition process a position where the contrast suddenly changes in the image, that is, a boundary between bright and dark regions, is detected by the early visual mechanism, and the detected information is sent to the brain in the post-stage where the object concerned is recognized. As shown in FIG. 15, the early visual mechanism is composed of visual cells 111, horizontal cells 112, and bipolar cells 113. The mechanism will be briefly explained below. First, when an image enters the early visual mechanism, only the visual cells 111 that receive the light are excited. The excitation is transmitted to the horizontal cells 112, which constitute a layer underlying the visual cells 111. Each horizontal cell 112 are planarly connected to about 6 adjacent horizontal cells 112, and the excitation is transmitted through this connection. Therefore, the excitation of the surrounding horizontal cells 112 changes gently as if it were transmitted through a network. The bipolar cells 113 are each connected to a visual cell 111 and a horizontal cell 112 and are excited in accordance with the difference in excitation intensity between these two cells 111 and 112. The excitation is further transmitted to the underlying layer. Finally, the excitation reaches the brain where recognition of the object and feature extraction are executed.

In actuality, when a boundary between bright and dark regions, such as the contour of an object, is considered as an image, the excitation intensity of the visual cells 111 in the early visual mechanism first changes rapidly, as shown by the curve A in FIG. 16(a). On the other hand, the excitation intensity of the horizontal cells 112 changes gently, as shown by the curve B in FIG. 16(a). Accordingly, the bipolar cells 113 are excited only at the boundary between bright and dark regions in accordance with the difference in excitation intensity between the cells 111 and 112, as shown by the curve C in FIG. 16(b), and the information on the boundary between bright and dark regions is transmitted to the brain where recognition processing is executed.

C. A. Mead et al. with the University of California constructed an early visual mechanism having the bright-dark boundary detecting function in the form of an electric circuit and experimentally produced it as a chip (see C. A. Mead and M. A. Mahowald, "A Silicon Model of Early Visual Processing", Neural Networks, vol. 1, pp. 91–97 (1988)). As shown in the partly enlarged circuit diagram of FIG. 17, the device of C. A. Mead et al. is composed of photodiodes 201, resistance networks 202 each comprising 6 resistors which connect the center and vertexes of a hexagon, and amplifiers 203. The photodiodes 201 function as visual cells, the resistance networks 202 as horizontal cells, and the amplifiers 203 as bipolar cells. At a boundary between bright and dark regions of an image, the voltage of the photodiode 201 changes stepwisely. On the other hand, the node voltage of the resistance network 202 changes gently. In accordance with the voltage difference, the voltage of the amplifier 203 changes only at the boundary between bright and dark regions. The changes in voltage of these elements are similar to the changes in excitation intensity of the cells shown in FIG. 16. Accordingly, the boundary between bright and dark regions, that is, the contour of the object, can be detected in the same way as in the case of the human early visual mechanism.

K. G. Birch proposed a technique of optically detecting a boundary between bright and dark regions, although it is not directly conscious of the early visual mechanism (see K. G. Birch, "A Spatial Frequency Filter to Remove Zero Frequency", OPTICA ACTA, vol. 15, No. 2, pp. 113–127 (1968)).

According to this method, the zero-order light component is cut off in the spatial frequency domain, thereby detecting a boundary between bright and dark regions in the image. If the proposed method is associated with the early visual mechanism, it may be interpreted as follows. For simplification, only the one-dimensional direction is considered with reference to FIG. 18. Information on light and dark in the image is represented by $\phi(x)$ (see FIG. 18(a)). If the light-dark information $\phi(x)$ is Fourier-transformed and passed through a filter $\{1-\text{rect}(\xi/b)\}$ that cuts off the zero-order light component, $$F\{\phi(x)\} \cdot \{1-\text{rect}(\xi/b)\} \qquad (1)$$

(see FIG. 18(b)) In the above expression, $F\{\ \}$ represents a Fourier transform, and $\text{rect}(x)$ is defined by $$\text{rect}(x) = 1 \quad (|x| \leq 1/2)$$
$$= 0 \quad (1/2 < |x|)$$

Further, b in $\text{rect}(\xi/b)$ is determined so that the zero-order peak of the diffraction pattern is substantially cut off by $\{1-\text{rect}(\xi/b)\}$. The inverse Fourier transform $f(x)$ of the expression (1) is given by $$f(x) = \phi(x) - \phi(x) * \text{sinc}(x/b) \qquad (2)$$

where * represents convolution, and $\text{sinc}(x)$ is given by $$\text{sinc}(x) = \sin(x/2)/(x/2)$$

$f(x)$ is obtained by subtracting $\phi(x)*\text{sinc}(x/b)$ blunted by the convolution from the light-dark information $\phi(x)$, as shown in FIG. 18(c). It will be understood by comparison of the expression (2) with FIG. 16 that the first term $\phi(x)$ of the expression (2) is similar to the response of the visual cells, while the second term $\phi(x)*\text{sinc}(x/b)$ of the expression (2) is similar to the response of the horizontal cells, and $f(x)$ is similar to the response of the bipolar cells. Thus, their methods can be said to be one way of representing the human early visual mechanism. Further, since the optical processing handles the intensity in actual practice, the processed image is expressed as $|f(x)|^2$, as shown in FIG. 18(d). Thus, the bright-dark boundary is obtained as a dark line sandwiched between a pair of light lines.

The above-described prior art device and method for detecting a bright-dark boundary suffer, however, from the following problems. The device of Mead et al. is suitable for integration and miniaturization which may be achieved by the existing LSI manufacturing technology, but it involves an unavoidable electrical delay of the constituent elements.

Therefore, the processing speed is relatively low. The method of Birch, which adopts an optical arrangement, is an excellent method that makes use of the inherent high-speed and parallel nature of light. In actual practice, however, this method cannot readily be realized because of the difficulty in attaining the required alignment between the constituent elements and low reliability with respect to temperature, vibration, etc. Accordingly, there is a demand for an inventive idea for enabling a bright-dark boundary to be optically detected with ease and at high speed.

The prior art device and method for detecting a bright-dark boundary make good use of the principle of the human early visual mechanism, and it is certain that the prior art device and method can realize recognition of a boundary line between bright and dark portions of a single object in an image. However, it is difficult for them to recognize an image containing a plurality of objects of recognition. The reason for this is that when the input image contains bright-dark boundary information on a plurality of objects, it is necessary to recognize each bright-dark boundary after segmenting the information into pieces of information for the respective objects. Although image recognition in a case where the number of objects contained in the input image is limited to one can be realized, for example, by a simple associative memory on a neural network. However, considerably advanced and complicated processing is needed for the segmentation of information for each object. It is not easy even for a neural network to realize such processing. Thus, a novel idea is needed to realize recognition of an image containing a plurality of objects to be recognized.

SUMMARY OF THE INVENTION

In view of the above-described circumstances, it is a first object of the present invention to provide a first type artificial retina cell, a second type artificial retina and an artificial visual apparatus which can optically detect with ease and at high speed a bright-dark boundary in an image that is necessary for recognition of an object in the image and for feature extraction, and also provide a method of producing the same.

It is a second object of the present invention to provide a visual artificial retina which has both the above-described first type artificial retina cell and a second type artificial retina cell different from the first type artificial retina cell, which are needed to recognize with ease and at high speed a plurality of objects from an image containing them, and also provide an artificial visual apparatus that employs the visual artificial retina.

As has been described above, it will be apparent that it is appropriate for recognition of an object in an image to apply the information processing principle of the human early visual mechanism and to utilize the bright-dark boundary information. The present invention also utilizes the bright-dark boundary information for the recognition processing. More specifically, the present invention employs the following first type artificial retina cell. That is, as shown in FIG. 1, the first type artificial retina cell includes a Fourier transform lens 10 which forms a Fourier transform image of information, which is focused on an input surface 9 defined by one lens end surface, on an approximately planar end surface at the side reverse to the input surface 9, and a filter 11 that is formed in close contact with the approximately planar end surface of the Fourier transform lens 10, which is reverse to the end surface defined as the input surface 9. The first type artificial retina cell further includes an inverse Fourier transform lens 13 which has an approximately planar end surface brought into close contact with the filter 11 and which forms an inverse Fourier transform image of the filtered information as information of real domain on an output surface 12 defined by the other end surface thereof. As the filter 11, a spatial frequency filter that cuts off the zero-order light component of the Fourier transformed diffracted light is employed. As will be clear from the above explanation, the first type artificial retina cell of the present invention is composed of optical elements. Therefore, the detection of a bright-dark boundary necessary for recognition of an object in the image can be effected in parallel and at high speed. Further, in the first type artificial retina cell of the present invention, a lens having an approximately planar end surface, e.g., a gradient index lens, is employed as each of the Fourier and inverse Fourier transform lenses 10 and 13. Accordingly, it is possible to make alignment between the constituent elements on the basis of the lens end surfaces. In addition, it becomes unnecessary to effect swing & tilt and alignment in the direction of the optical axis.

The method of producing the first type artificial retina cell according to the present invention will be explained below. The zero-order light cut-off portion 11a of the filter 11 in the first type artificial retina cell directly influences the detection of a bright-dark boundary and requires the highest degree of alignment accuracy. To provide the zero-order light cut-off portion 11a so as to extend in directions perpendicular to the optical axis (i.e., directions of axes $\xi$ and $\eta$ in FIG. 1) with a high degree of alignment accuracy, a method is adopted wherein an approximately planar exit end surface of the Fourier transform lens 10 which is reverse to the input surface 9 is defined as a filter surface 40, and the filter 11 is formed directly on the surface 40 with high accuracy, as shown in FIG. 6. The specific filter forming procedure will be explained below. First, a positive resist material, for example, is coated on the filter surface 40, and after prebaking, a parallel beam of light 41 is applied at right angles to the input surface 9. At this time, a diffraction pattern appears on the filter surface 40, resulting from the presence of the input surface 9 that acts as an aperture. However, most of the light converges on a light beam converging portion 42, as shown in FIG. 6, where the intensity is extremely higher than that in the other portion. The light beam converging portion 42 exactly coincides with the zero-order light component, which is desired to cut off by the filter 11. The period of time for irradiation with the light beam 41 is set so that only the light beam converging portion 42 is sufficiently exposed. Next, the resist is developed. Since it is a positive resist, only the portion corresponding to the zero-order light component, which has sufficiently been exposed, dissolves in the developer, while the other portion remains. Thus, the patterning process is completed. Further, a light-shielding material, e.g., a metal film, is attached to the zero-order light cut-off portion by vapor deposition or other similar method, and the resist portion is lifted off by an organic solvent. Thus, the zero-order light cut-off portion 11a of the filter 11 can be formed as a light-shielding film. The zero-order light cut-off portion 11a of the filter 11 directly influences the detection of a bright-dark boundary. With this method, however, since the filter 11 is directly formed by using the actual light beam for each individual lens to be used, the alignment accuracy, including the influence of an error in production of the lens itself, is improved by a large margin. Accordingly, the filter 11 can readily be formed with sufficiently high alignment accuracy to serve as a bright-dark boundary detecting filter for an artificial retina cell. It should be noted that the filter 11 may be provided on the input surface of the inverse Fourier transform lens 13 instead of being provided on the Fourier transform lens 10. It is also possible to use a silver salt photosensitive emulsion in place of the resist.

Thus, it will be understood that the method of producing the first type artificial retina cell makes it possible to solve the problems associated with the prior art method of Birch, that is, difficulty in attaining the required alignment accuracy, and low reliability with respect to temperature, vibration, etc., and to obtain readily an artificial retina cell capable of detecting a bright-dark boundary with sufficiently high accuracy to carry out a pre-processing function for recognition of an object.

Further, the first type artificial retina device according to the present invention has, as shown in FIG. 9, a focusing means 2 for transmitting information on an object O in an image, which is an object of recognition or feature extraction, to the above-described first type artificial retina cell. The artificial retina device has a plurality of first type artificial retina cells 6 arranged in parallel. The device further has a detecting means 8 for detecting information focused on the output surface 12 (see FIG. 1) at the back of the artificial retina cell 6.

With the above-described arrangement, the first type artificial retina device of the present invention can take information on an object at any position into the first type artificial retina cell with a desired size and detect a bright-dark boundary at high speed. Alternatively, the object information may be transmitted to a post-processing unit, for example, a neural network. In such a case, the system needs to be designed as follows:

That is, a first type artificial retina cell 6 is disposed in a central visual field 1a defined in the central portion of the artificial retina, and a zero-order light cut-off spatial frequency filter is used as the filter of the artificial retina cell 6. With this arrangement, a bright-dark boundary in the input image is detected, and the detected information is sent to the neural network in the post-stage to recognize the object (see FIGS. 4 and 12). It should be noted that the range of the first type artificial retina cell 6, that is, the central visual field 1a, is limited to a relatively small region on the artificial retina so that the artificial retina cell 6 recognizes approximately one object in the corresponding region in the input image. Accordingly, the recognition function can be realized by a relatively simple neural network as described above.

However, with the above-described arrangement, it is only possible to recognize one piece of object information that happens to be present in the central visual field 1a, but it is impossible to realize recognition of a plurality of objects in the input image containing them, which is the second object of the present invention. Therefore, it is desired to move the central visual field 1a to the position of information on another object of recognition in some way. For this purpose, it is necessary to determine the position of an object outside the central visual field 1a. Accordingly, the visual artificial retina according to the present invention has second type artificial retina cells 7 which are disposed in a peripheral visual field 1b defined outside the central visual field 1a. The second type artificial retina cells 7 are arranged in the same way as the first type artificial retina cell 6. That is, as shown in FIG. 3, each second type artificial retina cell 7 includes a Fourier transform lens 10 which forms a Fourier transform image of information, which is focused on an input surface 9 defined by one lens end surface, on an approximately planar end surface at the side reverse to the input surface 9, and a filter 11 that is formed in close contact with the approximately planar end surface of the Fourier transform lens 10, which is reverse to the end surface defined as the input surface 9. The second type artificial retina cell further includes an inverse Fourier transform lens 13 which has an approximately planar end surface brought into close contact with the filter 11 and which forms an inverse Fourier transform image of the filtered information as information of real domain on an output surface 12 defined by the other end surface thereof. As the filter 11, a higher-order light cut-off spatial frequency filter having a higher-order light cut-off portion 11c is employed. With this arrangement, only a low-frequency component in the input image, that is, an approximate shape of an object, is detected, and the position of the object in the peripheral visual field 1b is detected by using the detected information on the shape of the object.

Next, the central visual field 1a must be moved to a subsequent object of recognition by using the information from the second type artificial retina cells 7. Accordingly, an artificial eyeball 3 is composed of a visual artificial retina 1 such as that shown in FIG. 2, and a focusing means 2 for transmitting information on an object in an image, which is an object of recognition, to the visual artificial retina 1, as shown in FIG. 4. With this arrangement, the position of an object to be recognized subsequently is determined from the information detected by the second type artificial retina cells 7, and the artificial eyeball 3 is moved by an artificial eyeball moving means 5 that moves the central visual field 1a to the subsequent object of recognition.

The above-described arrangement will be explained below more specifically with reference to FIG. 4. The artificial visual apparatus of the present invention transmits information on an image containing a plurality of objects of recognition to the visual artificial retina 1 through the focusing means 2, takes approximately one object in the image information into the central visual field 1a of the artificial retina 1 to detect information on a bright-dark boundary of the object, and sends the information to the neural network 4 in the post-stage where object recognition is executed (in the illustrated example the bright-dark boundary of a triangular portion in the image is detected). At the same time, an approximate shape of an object other than the object presently recognized is detected in the peripheral visual field 1b of the visual artificial retina 1. Further, the position of an object to be recognized subsequently is determined by the artificial eyeball moving means 5. Upon completion of the recognition of the object presently recognized, the central visual field 1a is moved to the determined position where recognition of the subsequent object is executed. In FIG. 4, a square portion, for example, is selected as an object to be recognized subsequently, and the central visual field 1a is moved toward the selected object in the image (see FIG. 5). The described operation is repeatedly carried out. Thus, the artificial visual apparatus behaves like a human being that looks around for an object of recognition by moving the eyeball. As will be clear from the foregoing description, the first artificial retina cell of the present invention includes a Fourier transform lens having an approximately planar exit surface and forming a Fourier transform image of information input through an entrance surface thereof on the exit surface, and a filter provided in close contact with the exit surface of the Fourier transform lens to cut off at least a zero-order light component in the Fourier transform image. The first artificial retina cell further includes an inverse Fourier transform lens that has an approximately planar entrance surface which is provided in close contact with the filter, and that forms an inverse Fourier transform image of information input through the entrance surface.

The second artificial retina cell of the present invention includes a Fourier transform lens having an approximately planar exit surface and forming a Fourier transform image of information input through an entrance surface thereof on the exit surface, and a filter provided in close contact with the exit surface of the Fourier transform lens to cut off higher-order light components in the Fourier transform image. The second artificial retina cell further includes an inverse Fourier transform lens that has an approximately planar entrance surface which is provided in close contact with the filter, and that forms an inverse Fourier transform image of information input through the entrance surface.

In these artificial retina cells, it is practical to use a gradient index lens as each of the Fourier and inverse Fourier transform lenses.

The first artificial retina of the present invention includes an artificial retina cell, and an element for detecting output light from the artificial retina cell. The artificial retina cell includes a Fourier transform lens that forms a Fourier transform image of an input object image on a predetermined plane, and a filter disposed on the predetermined plane to cut off a zero-order light component in the Fourier transform image. The artificial retina cell further includes an inverse Fourier transform lens that returns the filtered Fourier transform image to the form of information of real domain by inverse Fourier transformation.

Preferably, the Fourier transform lens of the artificial retina cell has approximately planar entrance and exit surfaces, and the Fourier transform image is formed on the exit surface. Further, the filter is disposed in close contact with the exit surface. In addition, the inverse Fourier transform lens of the artificial retina cell has approximately planar entrance and exit surfaces. The entrance surface is disposed in close contact with the filter. The inverse Fourier transform lens is disposed so that the inverse Fourier transform image is formed on the exit surface.

The second artificial retina of the present invention includes a first type artificial retina cell, a second type artificial retina cell, and an element for detecting output light from the first and second type artificial retina cells. The first type artificial retina cell includes a Fourier transform lens that forms a Fourier transform image of an input object image on a predetermined plane, a filter disposed on the predetermined plane to cut off a zero-order light component in the Fourier transform image, and an inverse Fourier transform lens that returns the filtered Fourier transform image to the form of information of real domain by inverse Fourier transformation. The second type artificial retina cell includes a Fourier transform lens that forms a Fourier transform image of an input object image on a predetermined plane, a filter disposed on the predetermined plane to cut off higher-order light components in the Fourier transform image, and an inverse Fourier transform lens that returns the filtered Fourier transform image to the form of information of real domain by inverse Fourier transformation.

Preferably, the Fourier transform lenses of the first and second artificial retina cells each have approximately planar entrance and exit surfaces, and the Fourier transform image is formed on the exit surface. Further, the filter is disposed in close contact with the exit surface. In addition, the inverse Fourier transform lenses of the first and second artificial retina cells each have approximately planar entrance and exit surfaces. The entrance surface is disposed in close contact with the filter. Each inverse Fourier transform lens is disposed so that the inverse Fourier transform image is formed on its exit surface.

The artificial visual apparatus of the present invention includes an artificial eyeball having means for forming an object image and an artificial retina including the above-described first and second type artificial retina cells. The artificial visual apparatus further includes a neural network for executing pattern recognition of an object on the basis of information detected by the first type artificial retina cell of the artificial retina, means for determining an object to be recognized subsequently from information detected by the second type artificial retina cell of the artificial retina, and means for moving the artificial eyeball toward the object to be recognized.

The present invention also includes a method of producing an artificial retina cell, wherein a photosensitive material is coated on an approximately planar exit surface of a Fourier transform lens that forms on the exit surface a Fourier transform image of information input through an entrance surface thereof, and a beam of plane light is made incident on the entrance surface of the Fourier transform lens for a desired period of time so as to expose only a portion corresponding to a zero-order light component in the Fourier transform image formed on the exit surface. Then, the exposed portion is provided with a light-shielding means, and an inverse Fourier transform lens, which has an approximately planar entrance surface and forms an inverse Fourier transform image of information input through the entrance surface, is brought into close contact at its entrance surface with the light-shielding means.

According to the present invention, an artificial retina cell is provided, and an artificial retina is constructed by using the artificial retina cell. By using the artificial retina, it is possible to selectively recognize a specific object in an image containing a plurality of objects of recognition with ease and at high speed.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 7(a) and 7(b) show exemplarily an input image and the corresponding output image in a first embodiment of the present invention.

FIG. 8 shows the arrangement of an artificial retina cell according to a second embodiment of the present invention.

FIG. 9 is a schematic view showing the arrangement of an artificial retina according to a third embodiment of the present invention.

FIGS. 10(a) and 10(b) show exemplarily an output signal in the third embodiment.

DESCRIPTION OF THE PREFERRED EMBODIMENTS

Preferred embodiments of the artificial retina cell, artificial retina and artificial visual apparatus according to the present invention will be described below.

Figure 1:
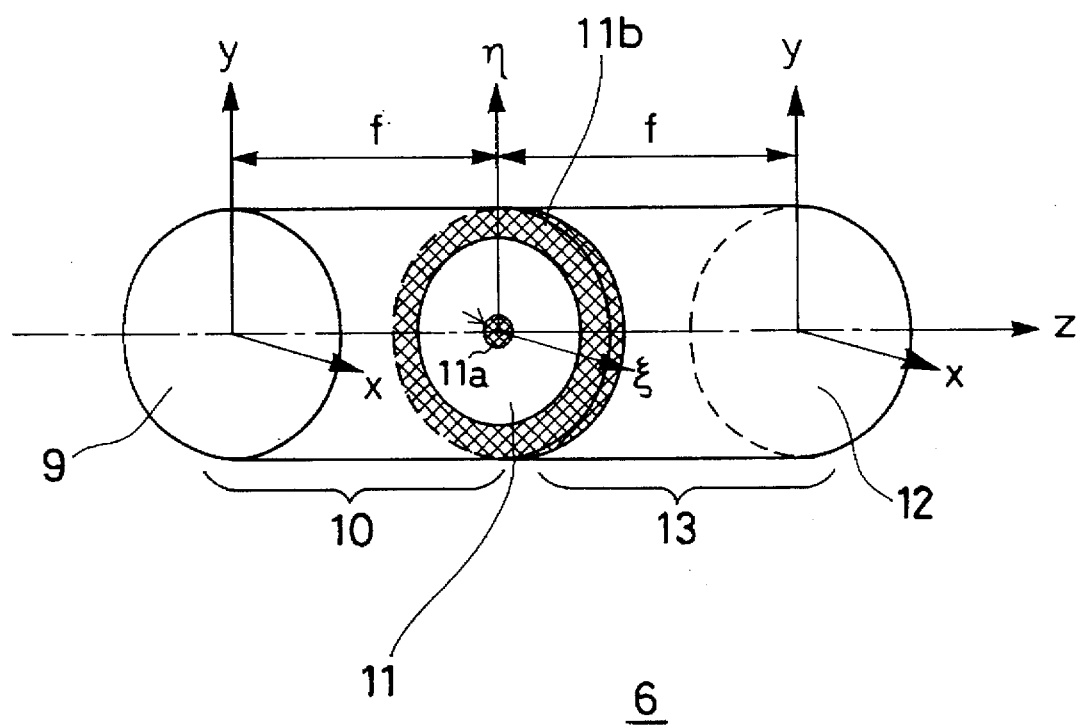
FIG. 1 shows the arrangement of the first type artificial retina cell according to the present invention.

First embodiment:

This embodiment relates to the artificial retina cell according to the present invention. As shown in FIG. 1, the Fourier transform lens 10 and the inverse Fourier transform lens 13 of the first type artificial retina cell for constituting an artificial retina are each formed by using a gradient index rod lens having a diameter of 1 mm, a 1-pitch length of 12.8 mm, a numerical aperture of 0.38 and a center refractive index of 1.557. The lens is used with a pitch length of 0.25. The term "1-pitch length" of the gradient index rod lens is the length required to form an image of the entrance end surface on the exit end surface as an erect image after forming it as an inverted image once halfway between the two end surfaces. The gradient index rod lens constituting the Fourier transform lens 10 has an approximately flat surface as a focal surface at the side reverse to the input surface 9. An aluminum film is formed on a portion of the approximately flat surface which has a diameter smaller than about 2 μm as a zero-order light cut-off portion (11a in FIG. 1) for detecting a bright-dark boundary by the above-described method of producing a filter by passing the actual light beam. In addition, an aluminum film is formed on a portion of the approximately flat surface which has a diameter larger than about 50 μm as a higher-order light cut-off portion (11b in FIG. 1; in this embodiment, it cuts off about 30th- and higher-order light components) for eliminating noise by an ordinary mask patterning process, thereby forming a filter 11. Next, the gradient index rod lens as the Fourier transform lens 10 formed with the filter 11 and the gradient index rod lens as the inverse Fourier transform lens 13 are bonded together, thereby forming a first type artificial retina cell (central visual field cell) 6.

For example, when a letter T as shown in FIG. 7(a) (the inside of the T, shown by black, is light) is input to the input surface 9 of the artificial retina cell, a T which is light only at the double-line portion, as shown in FIG. 7(b), appears on the output surface 12. The region between the pair of light lines represents the bright-dark boundary.

Second embodiment:

In the second embodiment, the Fourier transform lens 10 and the inverse Fourier transform lens 13 are each formed by using a lens block comprising 25 unit lenses arranged in a square configuration at a pitch of 0.4 mm, as shown in FIG. 8 (the figure shows a sectional view taken along the plane including the optical axis for simplification). Each unit lens comprises a gradient index planar micro-lens having a diameter of 0.2 mm, a focal length of 1 mm and a numerical aperture of 0.1. Each gradient index planar micro-lens in the Fourier transform lens 10 has a flat filter surface 40 defined by a focal plane thereof. An aluminum film is formed on a portion of the filter surface 40 which has a diameter smaller than about 8 μm as a zero-order light cut-off portion 11a for detecting a bright-dark boundary by the same filter producing method as in the first embodiment. Further, an aluminum film is formed on a portion of the filter surface 40 which has a diameter larger than about 65 μas a higher-order light cut-off portion 11b (in this embodiment, it cuts off about 10th- and higher-order light components) for eliminating noise by an ordinary mask patterning process, thereby forming a filter 11. Next, the gradient index planar micro-lens as the Fourier transform lens 10 formed with the filter 11 and the gradient index planar micro-lens as the inverse Fourier transform lens 13 are bonded together, thereby forming a first type artificial retina cell. In this embodiment also, a light double line such as that shown in FIG. 7(b) appears, and the region between the pair of light lines represents the bright-dark boundary. Although in this embodiment the double line is discontinuous because of the coarse lens pitch, it is not an essential problem because the influence of the discontinuous double line can be minimized by reducing the lens pitch and/or increasing the number of unit lenses used.

Although in the first and second embodiment the filter 11 is formed with the higher-order light cut-off portion 11b, it should be noted that this portion 11b is provided for elimination of noise from the input image and hence not essential. Accordingly, the filter 11 may comprise the zero-order light cut-off portion 11a alone. Further, although in FIGS. 1 and 8, which illustrate the first and second embodiments, respectively, both end surfaces of each lens used are shown to be planes, it should be noted that only the surfaces of the Fourier and inverse Fourier transform lenses 10 and 13 which are closer to the filter 11 need to be approximately planar and that the surfaces reverse to these surfaces need not be approximately planar.

Third embodiment:

Next, an artificial retina is formed by using the first type artificial retina cell as shown in FIG. 1 or 8. That is, as shown in FIG. 9, the artificial retina has a focusing means 2 for transmitting information on an object O in an image, which is an object of recognition or feature extraction, to the first type artificial retina cells 6. The first type artificial retina cells 6 process the transmitted information and extract bright-dark boundary information therefrom. The artificial retina further has a detecting means 8 for detecting the bright-dark boundary information extracted by the first type artificial retina cells 6. The detecting means 8 may further transmit the detected information to a post-processing unit that executes recognition or other advanced processing. With this arrangement, it is possible to readily realize a system whereby information on an object at any position is taken into the artificial retina with a desired size, and a bright-dark boundary is detected by the above-described processing. The detected information may be further transmitted to a post-processing unit, e.g., a neural network.

More specifically, as shown in FIG. 9, 63 artificial retina cells of the first embodiment are arranged on and bonded to a ⅔-inch CCD (about 6.6 mm and about 8.8 mm in length and breadth) with 420,000 pixels, which is used as the detecting means 8 (in the figure the number of artificial retina cells is reduced for simplification). Further, a zoom lens for VTR is used as the focusing means 2, thereby forming an artificial retina. For example, when a triangle (the inside of the triangle, shown by black, is light) is input to the artificial retina as the object O, as shown in the figure, a double-line triangle as shown in FIG. 10(a) is obtained from the ⅔-inch CCD with 420,000 pixels, serving as the detecting means 8. The region between the pair of lines represents the bright-dark boundary. If a linear sensor having 10×10 (total of 100) pixels is used in place of the CCD and a threshold of a certain level is set, a rough bright-dark boundary is obtained as a signal of bright dots (see FIG. 10(b)).

If the bright-dark boundary information from the detecting means 8 of the artificial retina is input to a neural network, it is possible to effect further advanced recognition of an object in the input image or further advanced feature extraction, as a matter of course.

Figure 2:
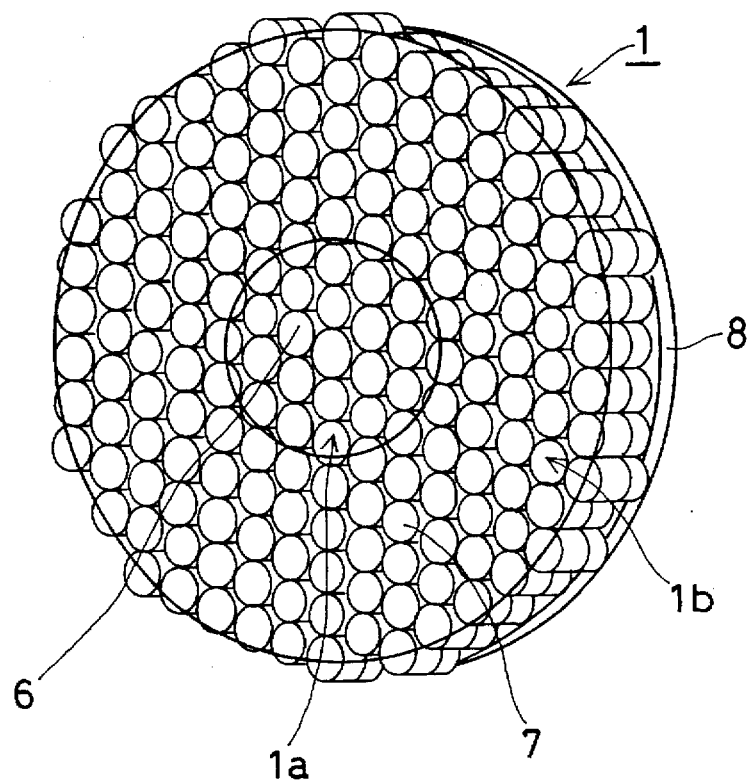
FIG. 2 is a schematic view showing the arrangement of the visual artificial retina according to the present invention.

Fourth embodiment:

This embodiment relates to a visual artificial retina comprising the first and second type artificial retina cells 6 and 7. The first type artificial retina cell 6 employed in this embodiment is the same as that in the first embodiment. The second type artificial retina cell 7 is the same as the first type artificial retina cell 6 of the first embodiment except for the filter 11. The filter 11 used in this embodiment has an aluminum film formed on a portion thereof that has a diameter larger than about 17 μm as a higher-order light cut-off portion (11c in FIG. 3; in this embodiment it cuts off about 10th- and higher-order light components) by an ordinary mask patterning process. As the detecting means 8 (see FIG. 2), a ⅔-inch CCD (6.6 mm and 8.8 mm in length and breadth) having 380,000 pixels is employed. One first type artificial retina cell 6 is disposed in an approximately central portion of the detecting means 8, and 62 second type artificial retina cells 7 are arranged in the other portion of the detecting means 8 in a matrix comprising 7 columns and 9 rows.

Figure 11B:
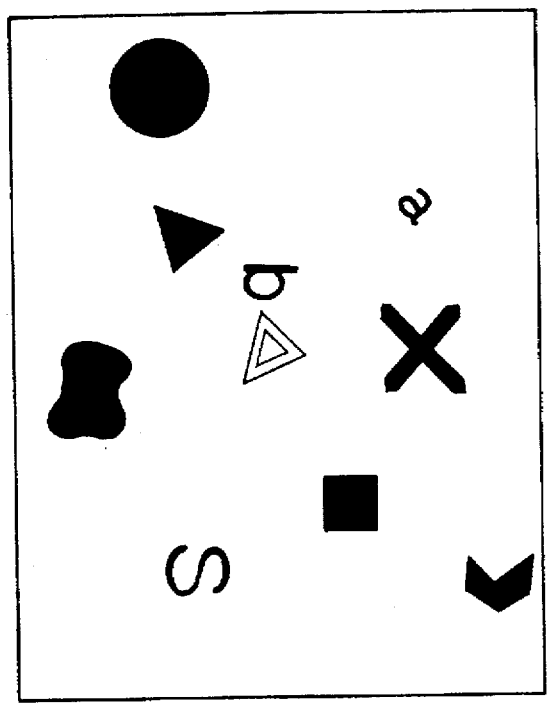
FIGS. 11(a) and 11(b) show exemplarily an input image and the corresponding output image in a fourth embodiment of the present invention.
Figure 11A:
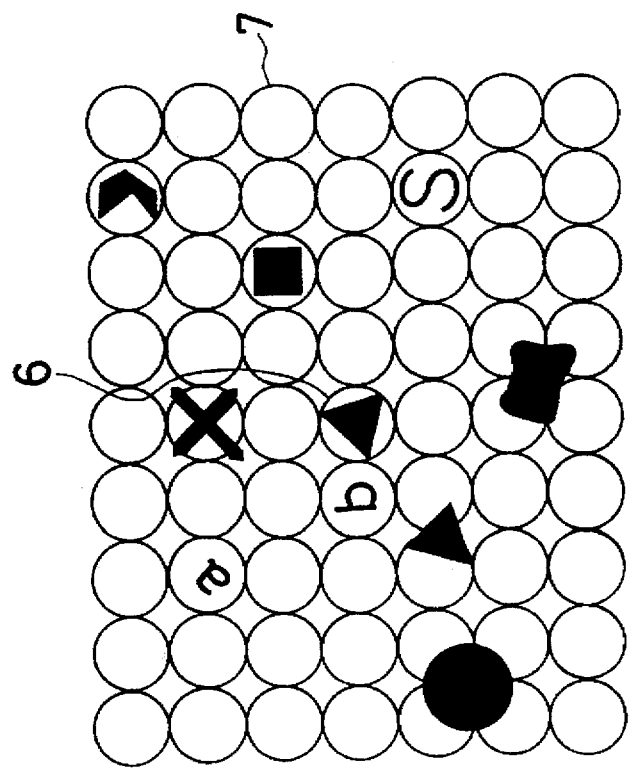

For example, when an image such as that shown in FIG. 11(a) (in which portions shown by black are light, while portions shown by white are dark) is input to the visual artificial retina, a double-line triangle is obtained in the central portion of the CCD serving as the detecting means 8, as shown in FIG. 11(b) (the region between the pair of lines is the bright-dark boundary), and image information representative of approximate information on other objects is obtained in the peripheral portion of the CCD. Although in this embodiment the filter 11 of the first type artificial retina cell 6 is formed with the higher-order light cut-off portion 11b, it should be noted that this portion 11b is provided for elimination of noise from the input image and hence not essential. Accordingly, the filter 11 may comprise the zero-order light cut-off portion 11a alone. Further, although in FIGS. 1 to 3 both end surfaces of each lens are planar, it should be noted that the reason for this is to simplify the alignment required to set up the system. Thus, the surfaces of the Fourier and inverse Fourier transform lenses 10 and 13 which are closer to the filter 11 need to be approximately planar, but the surfaces reverse to these surfaces need not always be approximately planar. Further, although the input and output surfaces 9 and 12 are set on the lens end surfaces for the same reason as the above, it is not always necessary to do so if it is allowed to slightly sacrifice the readiness of alignment. In addition, it will be apparent that an artificial retina having the same effectiveness as the above can be obtained by using gradient index planar micro-lenses as shown in FIG. 8 in place of the gradient index rod lenses.

Figure 3:
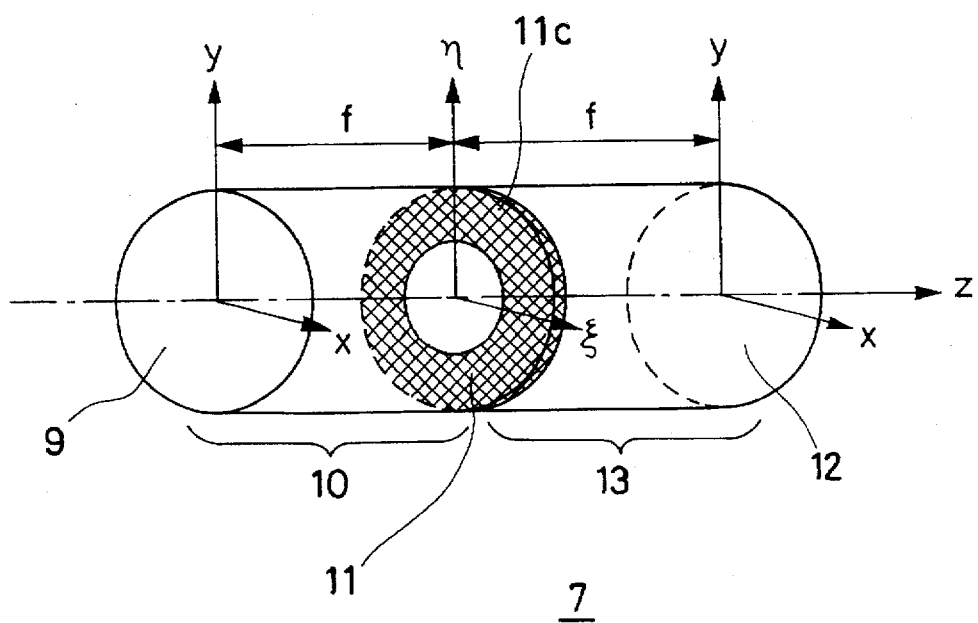
FIG. 3 shows the arrangement of the second type artificial retina cell according to the present invention.
Figure 4:
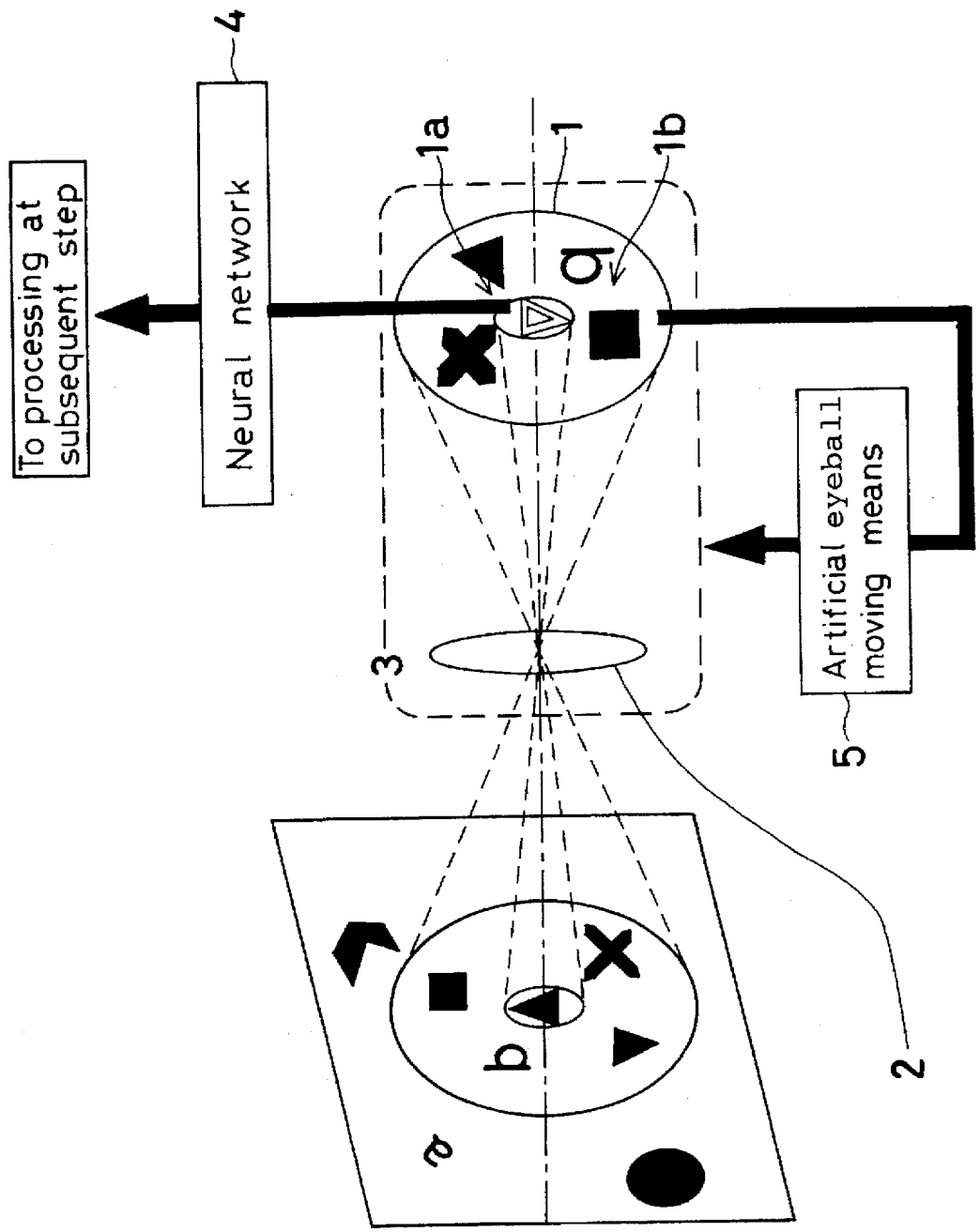
FIG. 4 is a schematic view showing the arrangement and operation of the artificial visual apparatus according to the present invention.
Figure 5:
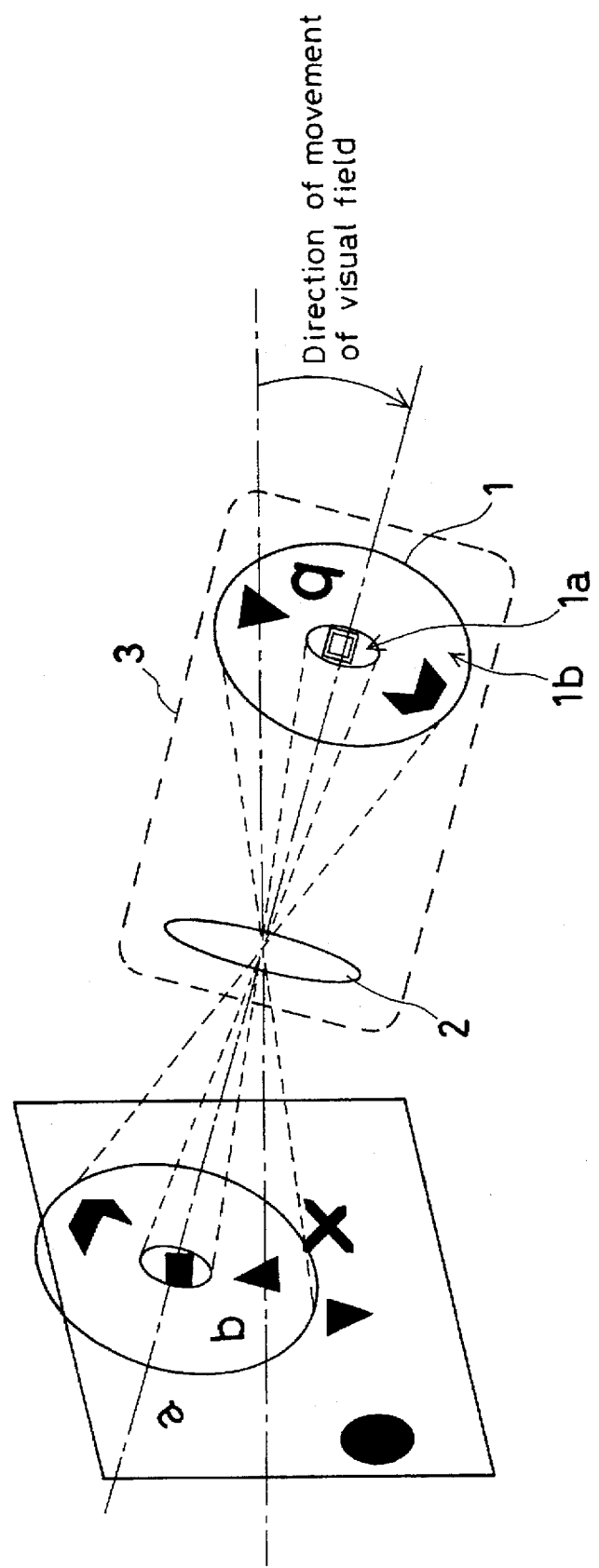
FIG. 5 is a view for explanation of movement of the visual field of the artificial visual apparatus.
Figure 6:
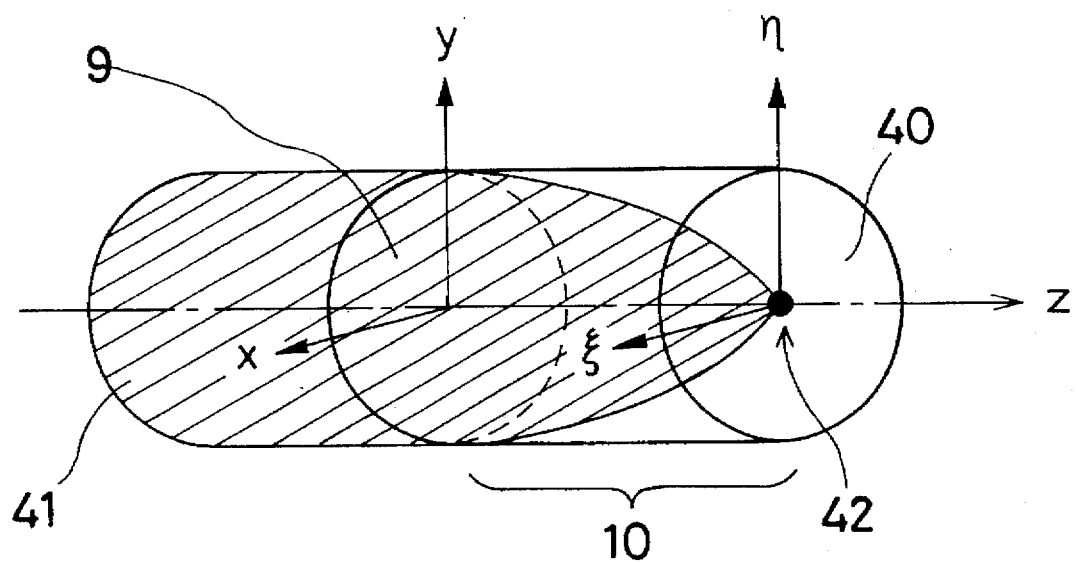
FIG. 6 is a view for explanation of a method of producing the first type artificial retina cell.
Figure 12:
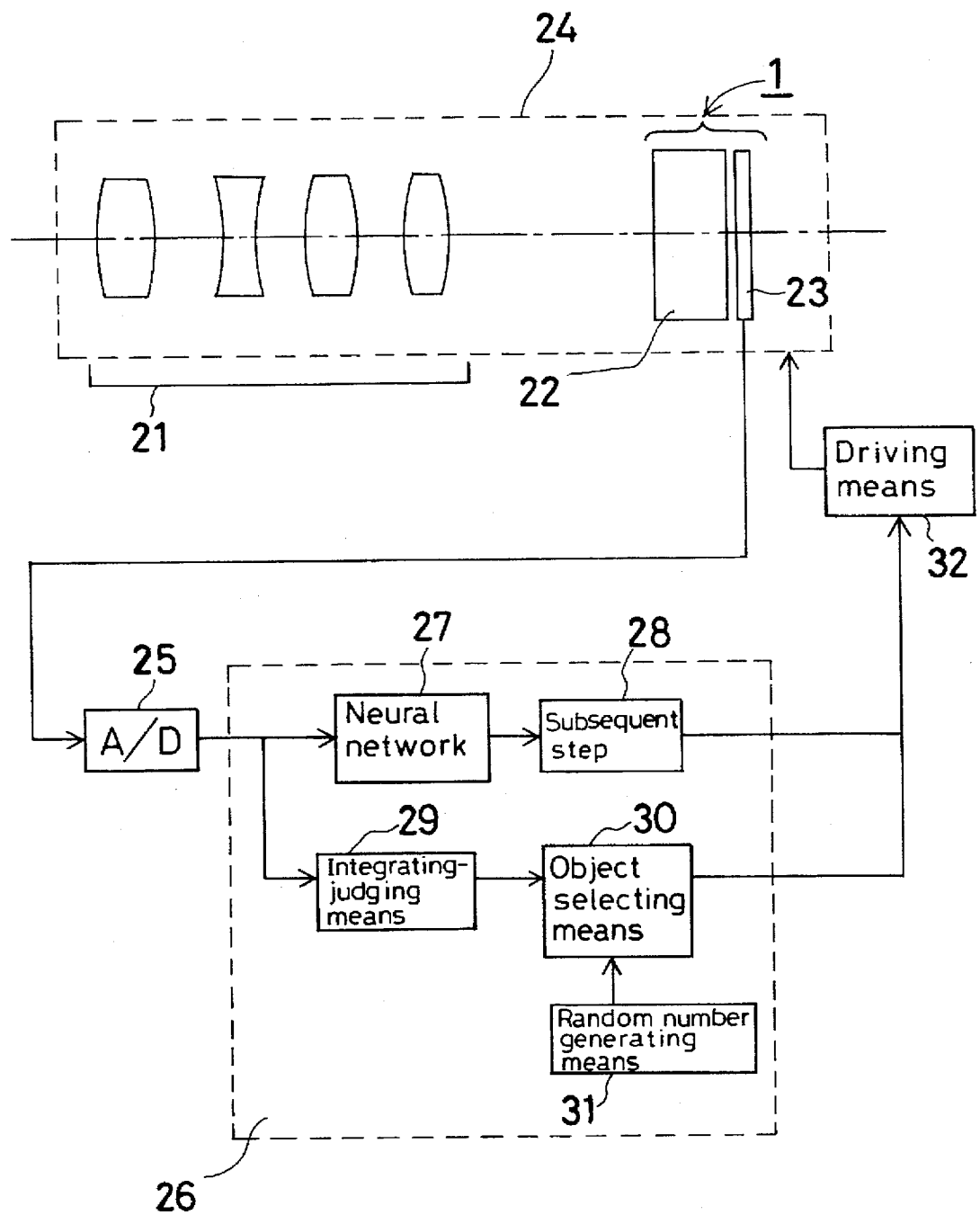
FIG. 12 shows the arrangement of an artificial visual apparatus according to a fifth embodiment of the present invention.
Figure 13:
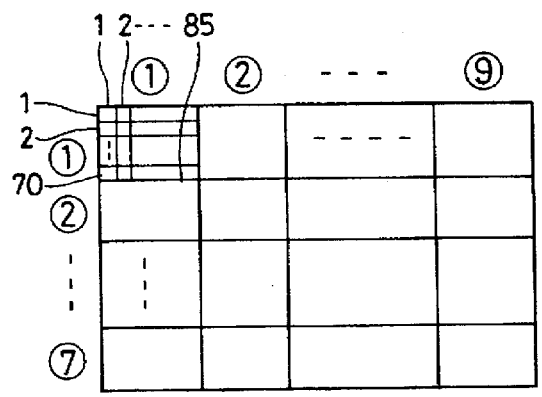
FIG. 13 shows exemplarily the pixel arrangement of a CCD image sensor and the way of dividing the screen thereof.

Fifth embodiment:

This embodiment relates to an artificial visual apparatus that makes use of the visual artificial retina of the fourth embodiment. FIG. 12 shows the arrangement of the artificial visual apparatus. Referring to the figure, an artificial eyeball 24 is composed of a zoom lens 21, a visual artificial retina cell unit 22, and a detecting unit 23 comprising a CCD image sensor. These constituent elements are accommodated in a single housing. The artificial eyeball 24 is movably provided so that the visual field can be changed with respect to a desired object. An object image is formed on the entrance surface of the visual artificial retina cell unit 22 by the zoom lens 21. The CCD image sensor 23 receives the object image through the artificial retina 22 and converts the image pattern into an electric signal. As shown in FIG. 13, the CCD image sensor 23 has about 770×490 pixels in breadth and length, and the entire screen is divided into 63 regions in 9 columns and 7 rows. A first type artificial retina cell 6 as shown in FIG. 1 lies in a portion corresponding to the central region of the CCD image sensor 23, and second type artificial retina cells 7 as shown in FIG. 3 are disposed in a portion corresponding to the remaining peripheral region. The output signal from the CCD image sensor 23 is converted into a digital signal in an A/D converter 25 and then input to a computer 26. Among the input image information, information on the central portion is input to a neural network 27 for pattern recognition, and the other information is used for detection of peripheral information.

Figure 14:
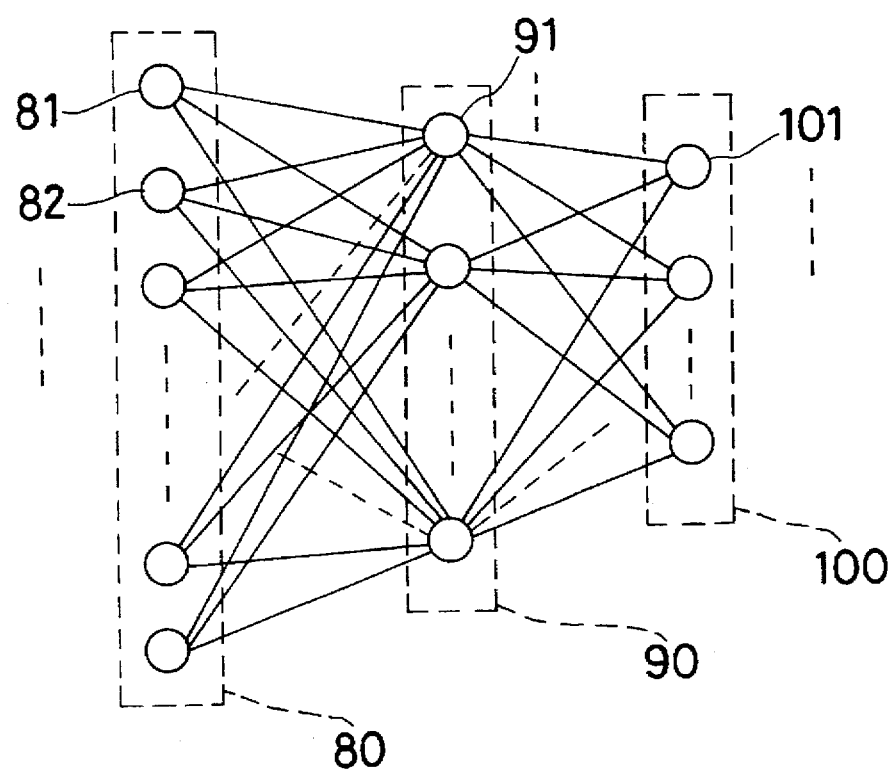
FIG. 14 is a view for explanation of the arrangement and operation of a neural network.
Figure 15:
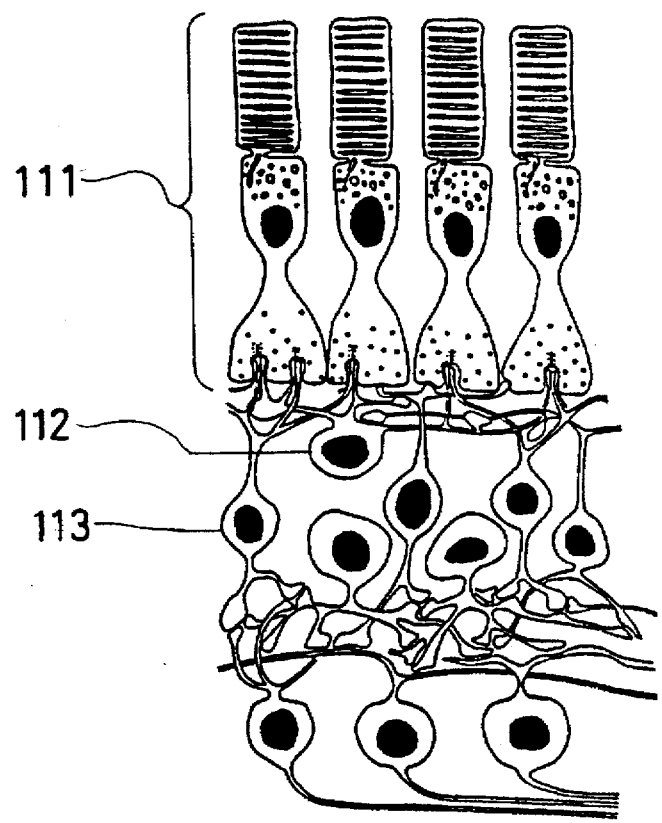
FIG. 15 is a view for explanation of the human early visual mechanism.
Figure 16A:
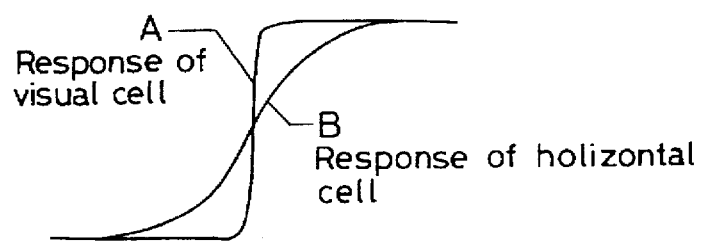
FIG. 16 shows the excitation intensity of each cell in the human early visual mechanism.
Figure 16B:
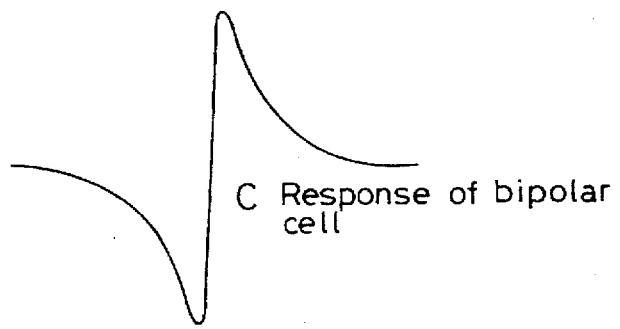
Figure 17:
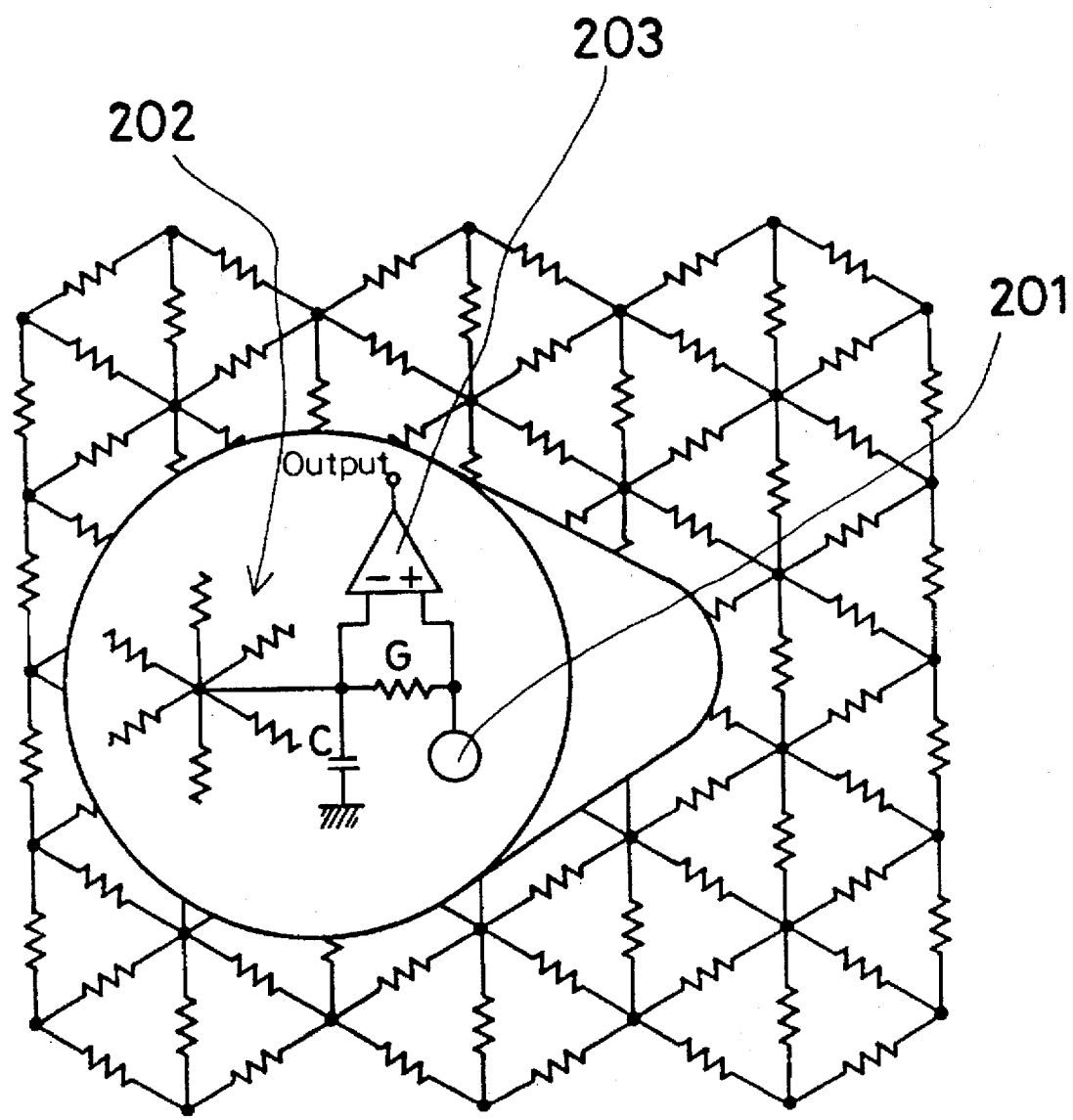
FIG. 17 is a circuit diagram showing one example of a conventional early visual mechanism.
Figure 18A:
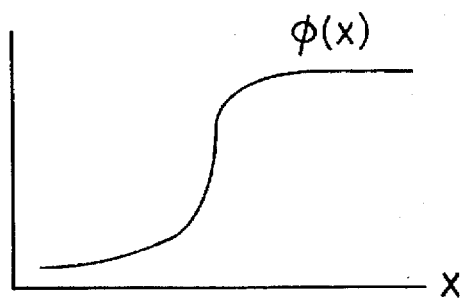
FIGS. 18(a)–18(d) are views for explanation of a conventional method of optically detecting a bright-dark boundary.
Figure 18B:
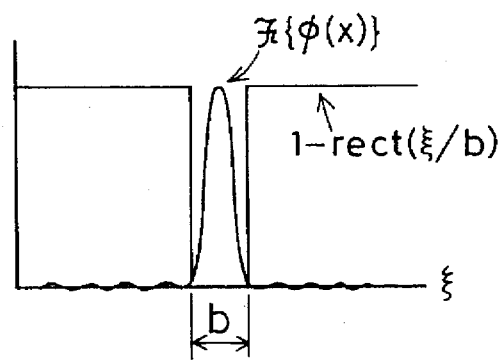
Figure 18C:
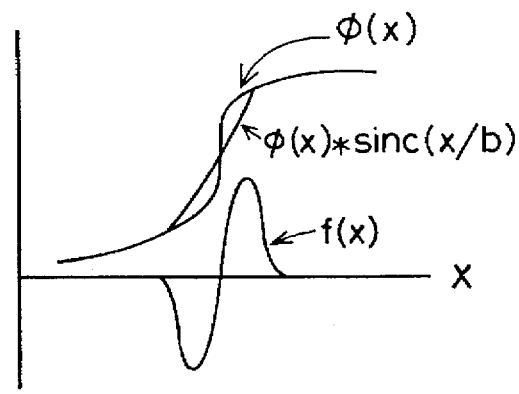
Figure 18D:
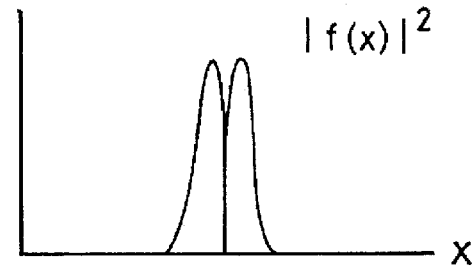

As shown in FIG. 14, the neural network 27 has an input layer 80, a hidden layer 90, and an output layer 100. 85×70 pieces of image information in the central region of the CCD image sensor 23, which corresponds to the first type artificial retina cell 6, are supplied to respective input units 81, 82, . . . of the neural network 27. With these pieces of image information, signals representative of an object pattern are output to output units 101, 102, . . . through intermediate units 91, 92, . . . Since the neural network 27 has been previously allowed to learn objects of recognition according to the back propagation rule by presenting them in the central visual field 1a, the shape of the object can be discriminated by the output signal from the neural network 27. The signal representative of the object shape is supplied to a subsequent step 28 where necessary information processing is further executed.

When there is no object image in the central region, or when another object is to be discriminated after recognition of an object in the central region, the peripheral information is used. The peripheral information is supplied to an integrating-judging means 29 where brightness is integrated for each region and the integrated value is compared with a predetermined threshold. If the integrated value exceeds the threshold value, it is judged that an object is present in the region concerned. The judgment information is supplied to an object selecting means 30. The object selecting means 30 selects one region from among regions judged that an object is present therein at random on the basis of a random number generated from a random number generating means 31. A signal representative of the selected region is supplied to an artificial eyeball driving means 32 to change the direction of the eyeball 24 so that the selected object comes in the center of the visual field.

Thus, it is possible to select objects to be recognized successively from an image containing a plurality of objects of recognition and discriminate them from each other for recognition.

When an object cannot be recognized by the neural network 27, the size of the image taken in the visual field is changed by varying the magnification of the zoom lens 21, and recognition process is executed once more. By doing so, it is possible to cope with such a situation that the desired object cannot be contained within the central visual field or it is too small, or another object interferes with the recognition.

It will be apparent that a two-dimensional map can be drawn on the image by combining together information obtained from the neural network 27 and information on the positions of objects obtained by the second type artificial retina cells 7. Further, a combination of two artificial visual apparatuses according to the present invention can be applied to recognition of a three-dimensional image. It is a matter of course that the neural network 27 is not necessarily limited to the neural network of the type having a layered configuration and employing the back propagation rule, which is used in the described embodiment, and that it is possible to employ any type of neural network which can be used in the manner of an associative memory model, e.g., Hopfield model, Associatron, etc. If information obtained from the neural network 27 is further transmitted to a post-processing unit, as shown in the figure, further advanced processing can be executed, as a matter of course.

According to the present invention, the artificial retina cells are composed of optical elements. Therefore, it is possible to effect recognition of object information, segmentation thereof and position detecting processing in parallel and at high speed. Since lenses having approximately planar end surfaces are employed, the constituent elements can be aligned with each other on the basis of the lens end surfaces, and it is unnecessary to effect swing & tilt and alignment in the direction of the optical axis. Further, the zero-order light cut-off portion of the filter, which directly influences the bright-dark boundary detecting function and which requires the highest degree of alignment accuracy and hence bottlenecks facilitation of the construction of the system, is formed by using the actual light beam. Accordingly, the alignment accuracy of the zero-order cut-off portion can be improved by a large margin. Thus, the system can readily be realized.

In the artificial visual apparatus of the present invention, the artificial retina is divided into two portions having different functions, that is, the central visual field and the peripheral visual field, so that the central visual field recognizes approximately one object at a time. Accordingly, a pattern recognizing means (neural network or the like) that executes recognition processing can be arranged in a considerably simple structure. In addition, a portion which is to be recognized subsequently is determined on the basis of information obtained from the peripheral visual field, and the central visual field is directed to the portion to be recognized by the operation of the artificial eyeball moving mechanism. Accordingly, a plurality of objects in the input image can be recognized by the neural network without changing the simple arrangement thereof.

Although the artificial retina cell, artificial retina and artificial visual apparatus of the present invention have been described by way of the embodiments, it should be noted that the present invention is not necessarily limited to the described embodiment and that various changes and modifications may be imparted thereto.

What I claim is:

1. A visual artificial retina comprising:
   a plurality of artificial retina cells; and
   an element for detecting output light from said plurality of artificial retina cells,
   wherein each retina cell includes a Fourier transform lens that forms a Fourier transform image of an input object image in a predetermined plane, a filter disposed in said plane to cut off substantially a zero-order light component of said Fourier transform image while permitting substantially all other orders of light to pass therethrough to form a filtered Fourier transform image, and an inverse Fourier transform lens constructed and arranged to convert the filtered Fourier transform image into real domain information by inverse Fourier transformation.

2. An artificial retina according to claim 1, wherein the Fourier transform lens and the inverse Fourier transform lens of said plurality of artificial retina cells each have substantially planar entrance and exit surfaces, said Fourier transform image being formed on said exit surface of said Fourier transform lens, said real domain information appearing as an inverse Fourier transform image being formed on said exit surface of said inverse Fourier transform lens, and said filter being disposed adjacently to said exit surface of said Fourier transform lens and said entrance surface of said inverse Fourier transform lens.

3. A visual artificial retina according to claim 2, wherein
   each Fourier transform lens of said plurality of artificial retina cells has the entrance surface thereof disposed in the same plane as the entrance surface of all other Fourier transform lenses, and
   each inverse Fourier transform lens of said plurality of artificial retina cells has the exit surface thereof disposed in the same plane as the exit surface of all other inverse Fourier transform lenses.

4. A visual artificial retina according to claim 1, 2 or 3, further comprising:
   focusing means for transmitting information from an object to the artificial retina cells.

5. A visual artificial retina according to claim 4, wherein the Fourier transform lens and inverse Fourier transform lens each comprises a gradient index lens.

6. A visual artificial retina comprising:
   at least one each of a first type and second type artificial retina cell, each type of cell including a Fourier transform lens constructed and arranged to form a Fourier transform image of an input object image in a predetermined plane, a filter disposed in said plane for forming a filtered Fourier transform image, and an inverse Fourier transform lens constructed and arranged to convert the filtered Fourier transform image into real domain information by inverse Fourier transformation;
   said first type artificial retina cell having said filter thereof being operable to cut off substantially a first zero-order light component while permitting substantially all other orders of light to pass therethrough;
   said second type artificial retina cell having said filter thereof being operable to cut off light components beyond and including a higher order light component while permitting a second zero-order light component and orders of light between said second zero-order light component and said higher order light component to pass therethrough; and
   an element for detecting output light from said first and second type artificial retina cells.

7. A visual artificial retina according to claim 6, wherein the Fourier transform lenses and the inverse Fourier transform lenses of said first and second type artificial retina cells are gradient index lenses each having substantially planar entrance and exit surfaces, said Fourier transform images being formed on said exit surfaces of said Fourier transformer lenses and said real domain information appearing as an inverse Fourier transform image formed on said exit surfaces of said inverse Fourier transform lenses.

8. An artificial visual apparatus comprising:
an artificial eyeball including
means for forming an object image, and
an artificial retina comprising at least one each of a first type and second type artificial retina cell,
each type of cell including a Fourier transform lens constructed and arranged to form a Fourier transform image of an input object image in a predetermined plane, a filter disposed in said plane for forming a filtered Fourier transform image, and an inverse Fourier transform lens constructed and arranged to convert the filtered Fourier transform image into real domain information by inverse Fourier transformation,
said first type artificial retina having said filter thereof being operable to cut off substantially a first zero-order light component while permitting other orders of light to pass therethrough,
said second type artificial retina cell having said filter thereof being operable to cut off light components beyond and including a higher order light component while permitting a second zero-order light component and orders of light between said second zero-order light component and said higher order light component to pass therethrough, and
an element for detecting output light from said first and second type artificial retina cells;
means for executing pattern recognition of an object on the basis of information detected by said first type artificial retina cell of said artificial retina;
means for selecting an object to be recognized from information detected by said second type artificial retina cell of said artificial retina; and
means for directing said artificial eyeball toward the object.

9. A visual artificial retina comprising:
a central visual field;
a peripheral visual field disposed about said central visual field,
said central visual field having at least a first type artificial retina cell including
a Fourier transform lens for forming a Fourier transform image of an input object image in a first predetermined plane,
a filter disposed in said first predetermined plane constructed and arranged to form a first filtered Fourier transform image by cutting off a zero-order light component of said Fourier transform image while allowing substantially all other orders of light to pass therethrough, and
an inverse Fourier transform lens for converting said first filtered Fourier transform image into real domain information by inverse Fourier transformation, and
said peripheral visual field having a plurality of second type artificial retina cells including
a Fourier transform lens for forming a Fourier transform image of an input object image in a second predetermined plane,
a filter disposed in said second predetermined plane constructed and arranged to form a second filtered Fourier transform image by cutting off a higher order light component of said Fourier transform image, and an inverse Fourier transform lens for converting said second filtered Fourier transform image into real domain information by inverse Fourier transformation; and
an element for detecting output light from said central and peripheral visual fields.

10. A visual artificial retina according to claim 9, wherein the Fourier transform lenses and the inverse Fourier transform lenses of said first and second type artificial retina cells are gradient index lenses each having approximately planar entrance and exit surfaces, said Fourier transform image and said inverse Fourier transform image being formed on said exit surface of said Fourier transform lenses and said inverse Fourier transform lenses, respectively.

11. An artificial visual apparatus comprising:
an artificial eyeball including
means for forming an object image,
an artificial retina comprising a central visual field and a peripheral visual field disposed about said central visual field, said central visual field having
at least a first type artificial retina cell including
a Fourier transform lens for forming a Fourier transform image of an input object image in a first predetermined plane,
a filter disposed in said first predetermined plane constructed and arranged to form a first filtered Fourier transform image by cutting off a zero-order light component of said Fourier transform image, and
an inverse Fourier transform lens for converting said first filtered Fourier transform image into real domain information by inverse Fourier transformation, and
said peripheral visual field having
a plurality of second type artificial retina cells including
a Fourier transform lens for forming a Fourier transform image of an input object image in a second predetermined plane,
a filter disposed in said second predetermined plane constructed and arranged to form a second filtered Fourier transform image by cutting off a higher-order light component of said Fourier transform image, and
an inverse Fourier transform lens for converting said second filtered Fourier transform image into real domain information by inverse Fourier transformation, and
an element for detecting output light from
said central and peripheral visual field;
means for executing pattern recognition of an object on the basis of information detected by said first type artificial retina cell of said artificial retina;
means for selecting an object to be recognized from information detected by said second type artificial retina cell of said artificial retina; and
means for directing said artificial eyeball toward an object.

12. An artificial visual apparatus according to claim 8 or 11, wherein the Fourier transform lenses and the inverse Fourier transform lenses of said first and second type artificial retina cells are gradient index lenses each having substantially planar entrance and exit surfaces,
said Fourier transform image and said inverse Fourier transform image being formed on said exit surface of said Fourier transform lenses and said inverse Fourier transform lenses, respectively.

* * * * *